March 16, 1971  F. CATALLO  3,570,081
APPARATUS FOR HANDLING AND TREATING KNIT FABRICS
Filed Aug. 22, 1967  6 Sheets-Sheet 1

INVENTOR.
FRANK CATALLO
BY
*F. J. Pisarra*
ATTORNEY

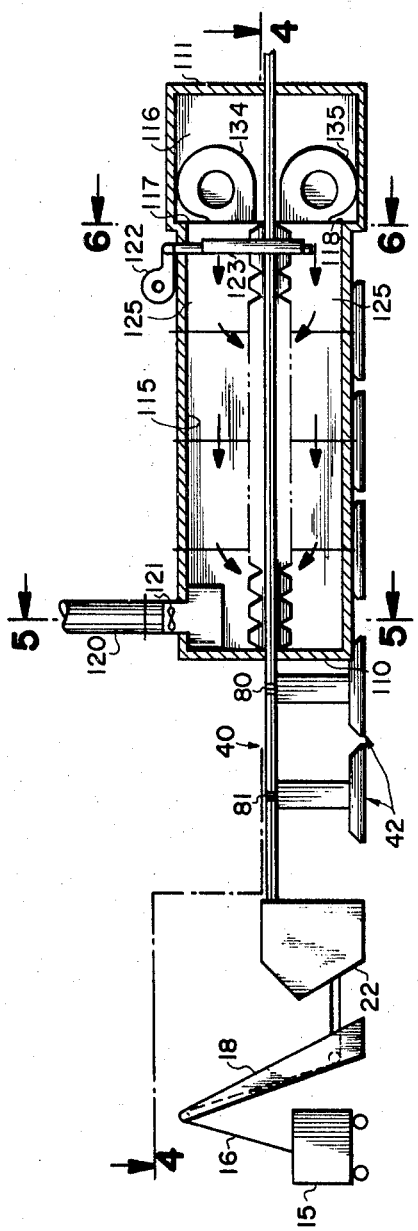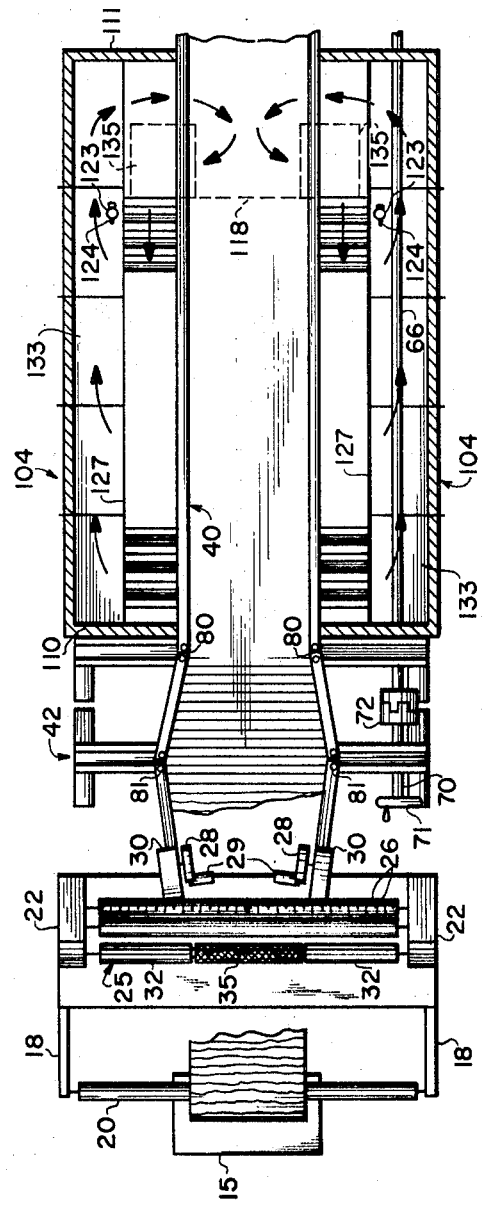

March 16, 1971  F. CATALLO  3,570,081
APPARATUS FOR HANDLING AND TREATING KNIT FABRICS
Filed Aug. 22, 1967  6 Sheets-Sheet 5
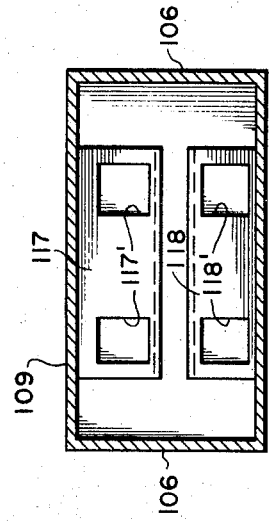
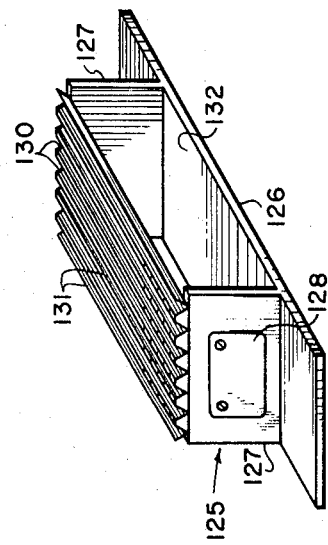
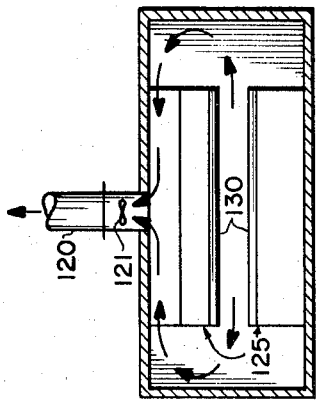
INVENTOR.
FRANK CATALLO
BY
F. J. Pisarra
ATTORNEY

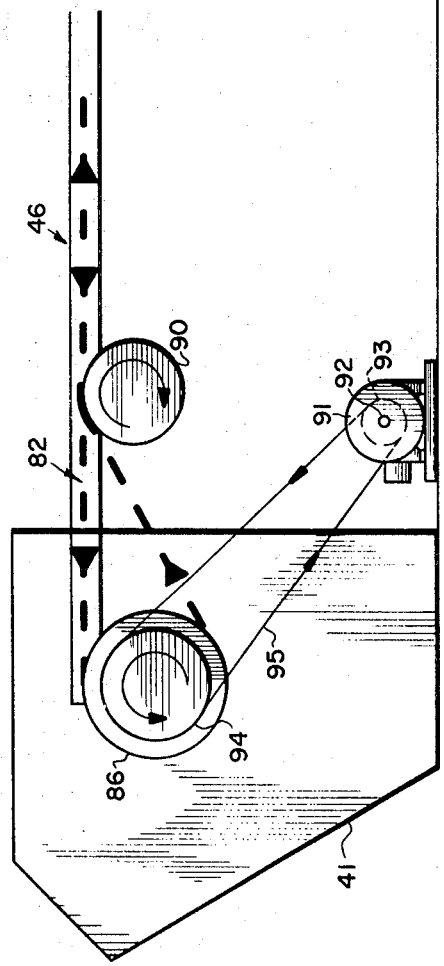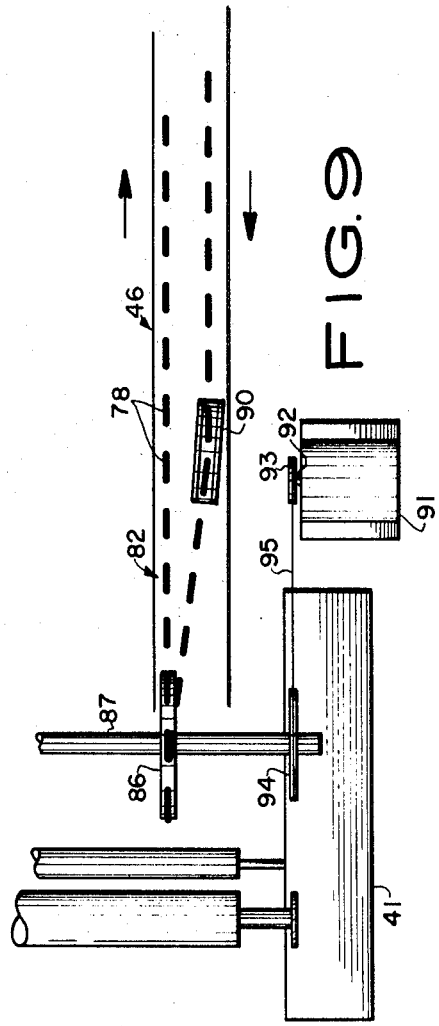

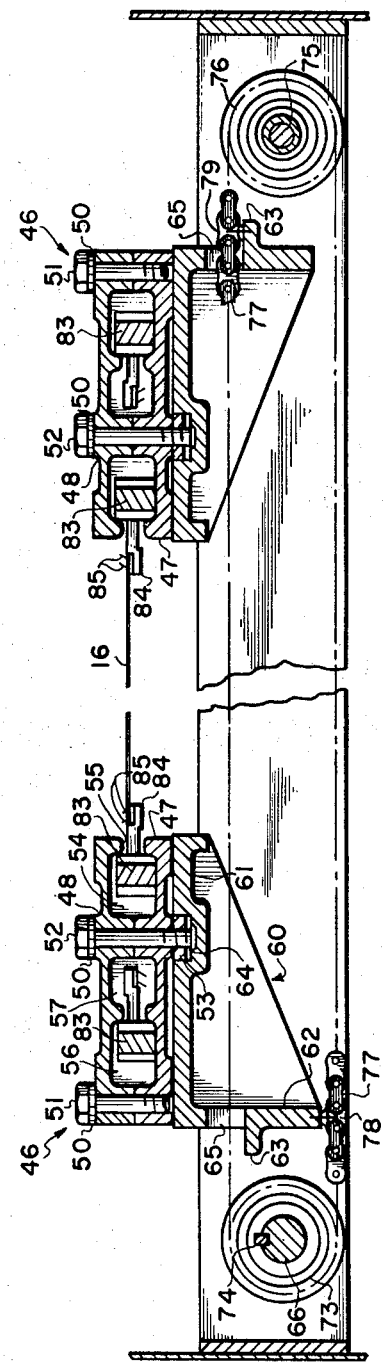

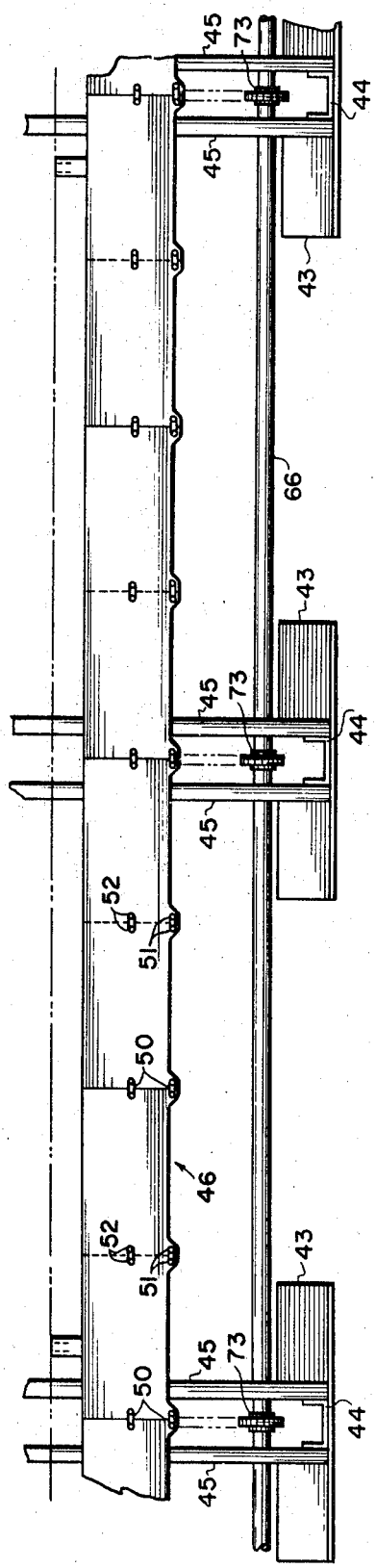
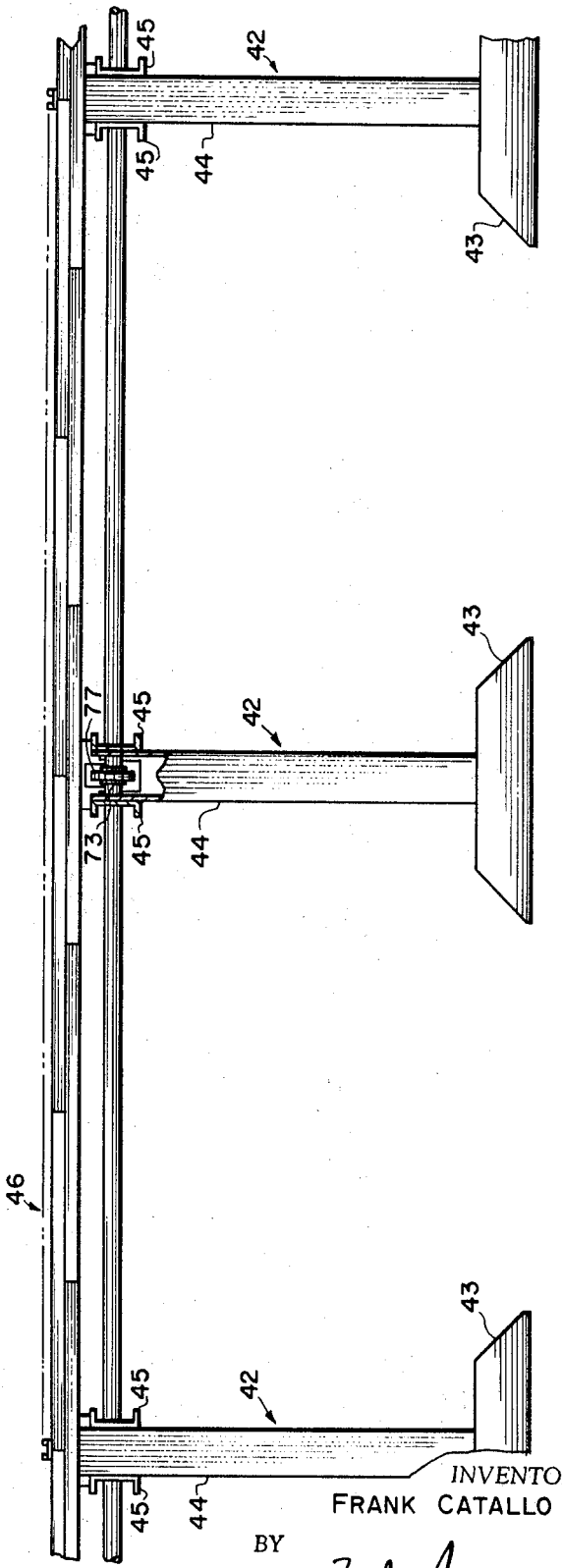

United States Patent Office 3,570,081
Patented Mar. 16, 1971

3,570,081
APPARATUS FOR HANDLING AND TREATING KNIT FABRICS
Frank Catallo, Elmont, N.Y., assignor to Fab-Con Machinery Development Corp., Peterson, N.J.
Filed Aug. 22, 1967, Ser. No. 662,450
Int. Cl. D06c 3/02
U.S. Cl. 26—61                                                    6 Claims

ABSTRACT OF THE DISCLOSURE

Apparatus for handling and treating fabrics, particularly open width knit fabrics, by means of suitable supports, conveying devices and controls, including an adjustable and flexible over and under pin tentering chain arrangement for effecting rapid spreading of the fabric and for conveying the fabric in a geometrically correct condition through a substantially closed zone at a controlled temperature with a plurality of streams of a gaseous medium flowing in a general direction which is opposite the path of movement of the fabric, the gaseous medium being directed against opposite surfaces of the fabric by means of nozzles in close proximity thereto.

BACKGROUND OF THE INVENTION

(1) Field of the invention

This invention relates to the art of handling and treating fabrics, especially those which are generally referred to as "knit fabrics."

Knit fabrics, due to their construction, are geometrically unstable by virtue of the fact that they are easily distorted when subjected to tensile and other forces in the course of normal handling and/or treating. The width and length dimensions of a knit fabric are so interrelated that tensions exerted in a lengthwise direction during treatment result not only in elongation of the fabric but also in distorting and narrowing of the fabric width. Moreover, additional problems are encountered when a knit fabric is processed in open width form, particularly as regards proper orientation and stabilization of the fabric geometry.

The industry has long recognized that it is both difficult and expensive to process knit fabrics in open width form because of the inability to effectively maintain desirable control over the geometry of the fabric. It has been the usual practice to process knitted fabrics in tubular form to control its geometry and subsequently slit and open the processed tube. This is objectionable for the reason that processing prior to slitting and opening creates an edge crease in the center of the fabric width. Such creases are highly undesirable in finished products and are very difficult to remove. Since the edge crease problem is avoided by processing a fabric in open width form, there has been a long-standing need for suitable equipment for properly and economically handling and treating open width knit fabrics.

(2) Discussion of the prior art

Commercially suitable equipment for handling and treating woven fabrics has been available to and utilized by the textile industry for many years. Such equipment, while satisfactory for use with woven fabrics, is not suitable for knit fabrics. This is due primarily to the differences in structural characteristics of those fabrics, woven fabrics having essentially stable geometric constructions in contradistinction to the unstable geometric construction of knit fabrics. As a consequence, known types of equipment for handling and treating woven fabrics are incapable of properly handling and treating knit fabrics.

While a number of attempts have been made over the years to develop and provide competent apparatus for effectively handling and treating open width knit goods, none, until the advent of this invention, has been commercially satisfactory from the dual viewpoints of quality control and economy.

SUMMARY OF THE INVENTION

This invention pertains to improvements in the art of handling and treating fabrics, particularly knit fabrics in open width form, and has for its primary objective the provision of apparatus having improved characteristics and capabilities for properly, effectively, efficiently and economically handling and treating such fabrics.

The apparatus of this invention is adapted to be advantageously used alone or with known accessory equipment to handle and treat various specific knit fabrics, to thereby properly reorient and stabilize or set the geometry of the fabric.

Another object of the invention is to provide apparatus of the character indicated having improved and simplified features of design and construction.

A further object of the invention is to provide apparatus of the character indicated that is relatively simple and compact in design; that is sturdy and durable in construction; that is reasonable in manufacturing, installation and maintenance costs; and that is capable of performing its intended functions in an efficient, dependable and economical manner.

Incorporated in the apparatus of this invention are a number of important features which contribute individually and collectively to the utility of the invention. These features are especially worthwhile not only for the reason that they are unique in tentering but also because they afford means for handling and treating knit fabrics in a manner that has long been sought by the art, but not heretofore realized, whether by use of existing woven fabric equipment or by other means.

One of the important features of the invention resides in the provision of an improved and simplified pin tentering chain system wherein the travel of the pin chains is in the form commonly referred to as "over and under" chain travel. In an over and under chain travel form, the chain sprocket wheels at the entry and exit ends of the apparatus are arranged vertically for rotation about horizontal axes. In horizontal chain travel, the sprocket wheels at the entry and exit ends of the apparatus are in a horizontal position for rotation about vertical axes and the chains travel along rails which are arranged side by side.

The over and under type chain travel of this invention is advantageous from the dual viewpoints of economy in manufacturing costs and greater facility in pinning and unpinning web materials. The last-named procedural step, namely unpinning, is one of the most important reasons why over and under chains are especially desirable. This permits controlled removal of the fabric through a series of support and wrap rolls and minimizes any danger of jamming at the exit end for the reason that stripping the fabric web from the pins is considerably more accessible than when the chain travel is entirely in a horizontal plane.

The chains employed with this invention are in the nature of swivel chains since they permit of relative movement of successive links about both horizontal and vertical axes. The swivel connections permit ready transfer of the plane of the chain from the vertical to the horizontal, and vice versa, in a relatively short distance thereby allowing for requisite flexibility and accommodation to support structures and accessory equipment. In addition, the swivel connections permit the chains to be readily adjusted for desired spreading of knit fabrics in the course of their being handled and treated.

The tenter pin chain system also includes improved chain housings through and along which portions of corresponding chains are adapted to be advanced and returned. The chain housings are unique in design and construction and afford worthwhile benefits as compared to conventional chain housings. Each chain housing comprises a series of lower sections arranged in tandem and a series of upper sections also arranged in tandem and overlying the lower sections. One end of each upper section is located between the ends of a lower section therebelow and the other end of such upper section is located between the ends of the next successive lower section therebelow. This results in a building block type construction, permitting interchangeability of sections with concomitant economies and eliminating the need for connecting parts between sections. One of the most important attributes of the chain housing construction is its compactness which permits placement of nozzles for treating the fabric very close to the cloth line and the placement of fabric supporting means, steam pipes or the like close to the cloth line.

By virtue of the unique chain housing and swivel chain constructions of this invention, selected portions thereof are pivotally arranged to permit of rapid spreading and narrowing of a web of knit fabric, as required. This is particularly important at the entrance region of the apparatus as it allows for desirable overspreading along a relatively short distance in a lengthwise direction of the fabric.

Cooperating with the tenter pin chain system for advancing and applying a web of a knit fabric thereto are other devices, including an improved main feed roll, which will be described further along herein.

The apparatus of this invention includes an improved tenter housing unit which constitutes another important feature. This housing unit is of modular construction and comprises a heat-insulated casing which contains an upper set of series-arranged, prefabricated nozzle units and a like, but relatively inverted lower set of nozzle units, that serve as corresponding plenum chambers. The chain housings and the nozzles are so designed and constructed that the nozzles are spaced apart only a short distance regardless of the horizontal spacing of the chain housings. This assures uniform air delivery across the length and width of the tenter housing unit and provides desirable fabric support in addition to the highest degree of heat transfer in the shortest space.

Blowers are positioned at the forward end of the tenter housing unit and communicate with the forward ends of the plenum chambers to produce and direct a stream of a gaseous medium, usually air, through the plenum chambers in a direction opposite to the path of the web material in the course of its movement through the tenter housing. These parts are so arranged as to attain substantially uniform velocity and temperature of the gaseous medium as it flows through the plenum chambers and is dicharged by the nozzles onto the fabric.

The tenter housing unit is provided with an open passageway along each side thereof. These passageways extend the full length of the tenter housing and permit unobstructed recirculation of the gaseous medium, after being emitted through the nozzles, to the blowers. The tenter housing unit is equipped with doors to allow for convenient ready entry to the recirculation passageways. This permits of ready access to the interior of the housing unit for maintenance, cleaning or other purpose, as may be required.

The prefabricated modular construction of the tenter housing unit affords a number of distinct advantages over conventional constructions, including simplicity of construction and installation and substantial reduction in construction costs. Moreover, additional housing units may be readily arranged in tandem, as required, at relatively low cost and with a minimum lapse of shutdown time in converting the apparatus from a construction having a single tenter housing unit to one having multiple such units.

The enumerated objects, features and advantages, as well as additional objects, features and advantages, will be readily appreciated by persons trained in the art from the ensuing detailed description and the accompanying drawings which describe and illustrate a preferred arrangement of apparatus embodying the invention.

DESCRIPTION OF THE DRAWINGS

In the drawings wherein like reference numerals denote corresponding parts through out the several views:

FIG. 3 is a view corresponding to FIG. 1, certain parts being omitted and certain other parts being shown in central vertical cross section for better illustration;

FIG. 4 is a view taken along staggered line 4—4 of FIG. 3, parts being broken away for better illustration of other parts;

FIG. 5 is a view taken along line 5—5 of FIG. 3;

FIG. 6 is a view taken along line 6—6 of FIG. 3;

FIG. 7 is an enlarged isometric view of a nozzle unit which is also shown in other views;

FIG. 8 is a view in side elevation illustrating portions of an over and under pin chain system, which forms part of the apparatus of this invention, and drive means therefor;

FIG. 9 is a top plan view of FIG. 8;

FIG. 10 is a view in enlargement taken along line 10—10 of FIG. 2, parts being omitted for better illustration;

FIG. 11 is a central longitudinal cross sectional view of an overfeed roll arrangement which is also shown on a smaller scale in other views, including FIG. 4;

FIG. 12 is a top plan view in enlargement of a portion of the chain support rails, together with supporting means and positioning means therefor; and FIG. 13 is an elevation view of the construction shown in FIG. 12, partly in cross section.

DESCRIPTION OF THE PREFERRED EMBODIMENT

Figure 1:
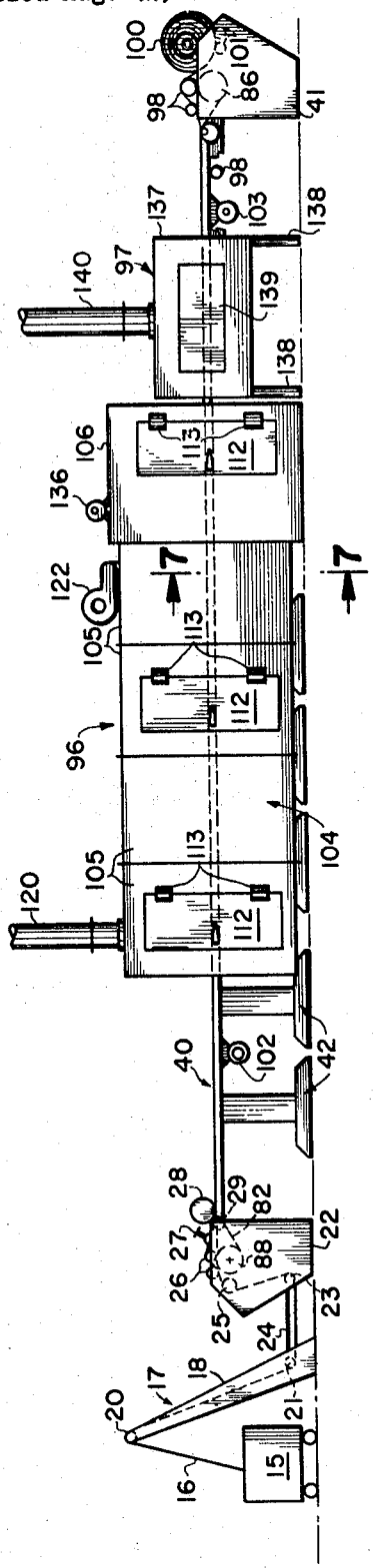
FIG. 1 is a view in side elevation of an arrangement of fabric handling and treating apparatus constructed in accordance with this invention.

Reference is initially had to FIGS. 1 through 4 which depict a hand truck 15 that contains a supply of a previously batched fabric which, for the purposes of this description, is assumed to be a wet, partially processed, open width knit fabric. The fabric is withdrawn from the truck and is handled and treated by the illustrated apparatus, as will be described, in the form of a web 16. The fabric web passes from the truck to a cloth entry and feed system 17 which includes a pair of spaced, parallel, inclined supports 18, a cloth entry skyroll 20 between the upper ends of the supports and at least one lower cloth entry roll 21 between and proximate the lower ends of the supports.

Positioned forwardly of supports 18 is a second pair of spaced parallel supports 22 which carry a guide roll 23 adjacent their lower ends and a series of rolls at or near their upper ends. An operator's platform 24 extends between and is secured to supports 18 and 22 at a convenient location above the axes of rolls 21 and 23. The referred-to series of rolls comprises a main feed roll 25 and a plurality of uncurling rolls 26. The several rolls 20, 21, 23, 25 and 26 are rotatable about corresponding parallel horizontal axes. As is indicated in FIG. 1, the fabric web 16 engages and passes over roll 20, under roll 21, platform 24 and roll 23 in the order named, over roll 25 and under rolls 26. These rolls are grouped to form the cloth entry and overfeed system 17 and are driven by a variable speed electric motor (not shown). Rolls 20, 21, 23 and 25 are driven at the same peripheral speed, while uncurling rolls 26 are driven at a slightly higher synchronized peripheral speed.

Supports 22 also carry a guider 27 and fabric edge control and pinning wheels 28 and 29 which are actuated by corresponding variable speed electric motors 30 (FIG. 4). These devices follow and cooperate with the grouped overfeed rollers to form a complete overfeed and underfeed system for delivering fabric in a controlled manner to the pin chain system.

Main feed roll 25 is located adjacent the fabric entering end of the tenter pin frame and is adjustable in speed to provide desirable overfeed of the fabric web, as required in use. This roll, as best shown in FIG. 11, preferably comprises three coaxial rollers, namely a central roller 31 and a pair of end rollers 32, all of which are carried by a driven rotary shaft 33. Central roller 31 is coupled to shaft 33 by a key 34 for rotation therewith and is provided with a cover 35 of a suitable material to effect requisite frictional engagement with the fabric web, whereby the latter is advanced in a desired manner in response to rotation of the shaft. Rollers 32 are freely rotatable relative to shaft 33 through the medium of corresponding ball bearing units 36. Thus, it will be observed that rollers 32 serve as idlers since they neither assist nor hinder feeding of the fabric web. In other words, all such feeding of the fabric web is performed by roller 31. Rollers 32 assume the speed of edge control wheels 28 thus enabling the skew of the fabric to be aligned before pinning.

As was stated earlier herein, the apparatus of this invention includes an improved pin chain system which constitutes one of the important features of the invention. This system is generally indicated by numeral 40 and comprises a supporting structure which includes earlier described supports 22, a pair of similar supports 41 at the forward end, and a plurality of spaced, inverted, generally U-shaped support units which are positioned intermediate supports 22 and 41. Each inverted U-shaped support, as best shown in FIGS. 12 and 13, comprises a pair of stands 42 consisting of an angle base member 43 and a channel upright member 44. A pair of spaced horizontal channel members 45 are secured to the upper ends of corresponding pairs of upright members 44. The several members 43, 44 and 45 of each set are preferably welded to obtain rigid unitary supports.

Reference is now had to FIGS. 4, 8, 9, 10, 12 and 13 for an understanding of the construction and operation of the pin chain system 40. This system includes a pair of relatively adjustable hollow chain housings 46 which are disposed in a horizontal plane and which are carried by the above-described supporting structure. Each chain housing consists of a series of lower rail sections 47, which are arranged in end-to-end relation, and a series of upper guide rail sections 48, which are also arranged in end-to-end relation. The lower and upper sections are staggered with respect to each other in a lengthwise direction so that the lines of abutment of successive pairs of lower sections are intermediate the ends of the upper sections directly thereabove. The several upper and lower rail sections are joined together by means of washers 50, screws 51 and bolts 52 which engage taps in corresponding slide blocks 53. Each chain housing is so configured internally as to provide a chain advance passage 54, a slot 55 establishing communication between passage 54 and the exterior of the housing, a chain return passage 56 and a pin arm return passage 57 communicating with passage 56.

Each chain housing is mounted on a plurality of saddles which are arranged in pairs that are located between corresponding pairs of horizontal channel members 45. Each saddle includes a horizontal member 61 and a depending vertical member 62 having a laterally projecting lug or ear 63. Horizontal member 61 is provided with a groove 64 to accommodate the lower ends of bolts 52 and their nuts 53, as illustrated in FIG. 10. Vertical member 62 has a through slot 65 directly above its ear 63.

Figure 2:
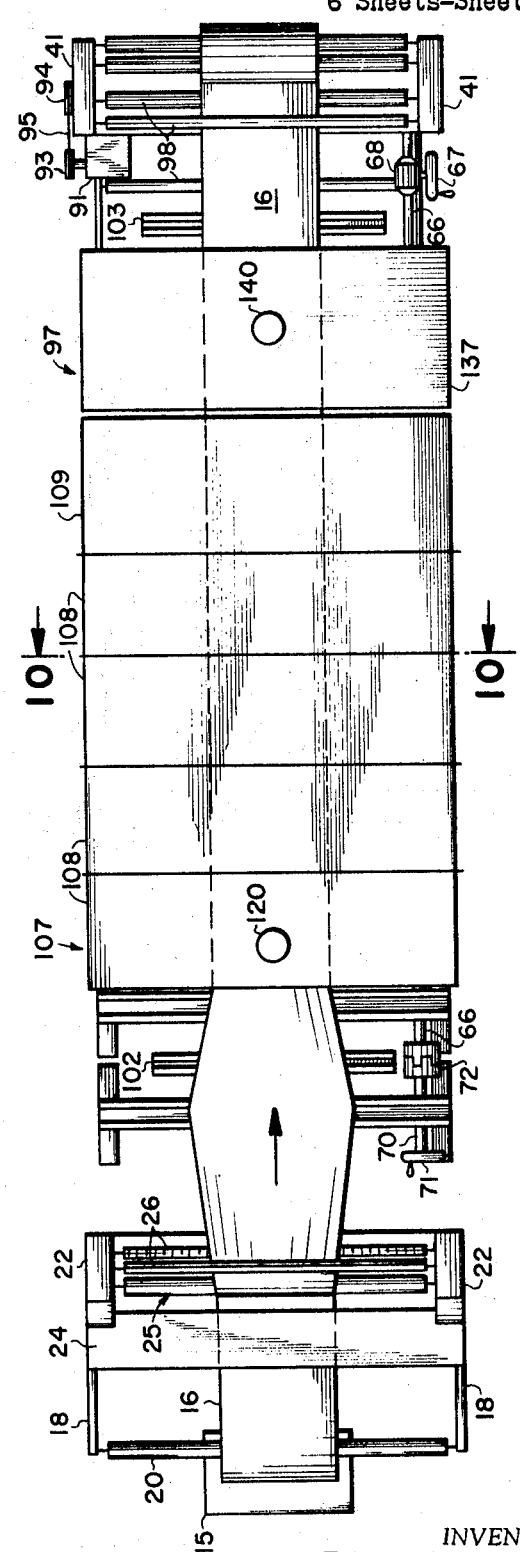
FIG. 2 is a top plan view of FIG. 1.

The saddles 60 and, therefore, the chain housing along one side of the apparatus are adapted to be readily adjusted and moved toward and away from the saddles and the chain housing along the other side of the apparatus, as required, by an arrangement of devices that will now be described, having reference to FIGS. 2, 4, 10, 12 and 13. Such devices include an elongated shaft 66 which is supported for rotation in a plurality of the horizontal channel member 45. This shaft is equipped at its forward end with a handwheel 67 and a gear train unit 68 for imparting rotation thereto. A relatively short second shaft 70 is supported for rotation in the horizontal channel members 45 of the inverted U-shaped support unit at the rear end of the apparatus and is equipped with a handwheel 71 (FIGS. 2 and 4). Shafts 66 and 70 are coaxial and are adapted to be placed into and out of coupling engagement by a clutch 72. When the clutch is in active service, shafts 66 and 70 are adapted to be rotated in unison. When the clutch is out of active service, shafts 66 and 70 are disengaged and are adapted to be rotated independently by their respective handwheels 67 and 71.

Shaft 66 carries a plurality of sprocket wheels 73 which are located between corresponding pairs of horizontal channel members 45. These sprocket wheels are removably secured to shaft 66 by corresponding keys 74 for rotation therewith (FIG. 10). Shaft 70 also carries a sprocket wheel (not shown) which is located between the rearwardmost pair of horizontal channel members 45, and which is secured to shaft 70 by a corresponding key (also not shown).

A second shaft 75 is mounted in the same horizontal channel members 45 as shaft 66. Shafts 75 and 66 are spaced apart and parallel as indicated in FIG. 10. Shaft 75 is equipped with sprocket wheels 76, corresponding in size and number to sprocket wheels 73. Sprocket wheels 76 are freely rotatable about the axis of shaft 75. Coaxial with shaft 75 is a stub shaft (not shown) which is spaced from and parallel to shaft 70 and is supported by the same horizontal channel members 45 as shaft 70. This stub shaft is also provided with a freely rotatable sprocket wheel corresponding to sprocket wheels 76.

Each set of sprocket wheels 73 and 76 is engaged by a corresponding endless chain 77 which is best shown in FIG. 10. As indicated in that view, chain 77 extends over sprocket wheel 73, through saddle openings 65, over and under sprocket wheel 76, under saddles 60 and then under sprocket wheel 73. The chain is pinned to the lower end of one saddle 60, as indicated at 78, and is pinned to lug 63 of the companion saddle, as indicated at 79, to effect movement of the saddles and the corresponding chain housings toward or away from each other, depending on the direction of rotation of shaft 66. Upon rotation of shaft 66 in a clockwise direction as viewed in FIG. 10, the upper horizontal portion of chain 77 moves toward the right and the lower horizontal portion moves toward the left. This causes the saddles and their chain housings to be moved apart a greater distance. Upon counterclockwise rotation of shaft 66, the indicated portions of the chain move in reverse directions, thereby causing corresponding movement of the saddles and the chain housings toward each other.

Portions of each chain housing at the entry end of the apparatus are provided with hinge connections, including those indicated at 80 and 81 to permit relative pivotal movement about vertical axes. This permits of rapid overspreading of the fabric web at the entry region of the apparatus along a relatively short distance measured in a lengthwise direction.

The illustrated construction also includes a pair of over and under pin chain arrangements which are illustrated in FIGS. 1, 8, 9 and 10, to which reference is now had. Each pin chain arrangement includes a continuous chain 82 (FIGS. 8 and 9) which comprises links 83 (FIG. 10) that ride in and along a corresponding chain housing 46. Chain 82 is of a type that permits swivel or universal movement between successive links. A preferred chain construction is that disclosed in W. W. Sayers et al. Pat. No. 2,091,836, to which reference may be had for details of construction and operation. This type chain has the further advantage that parts thereof may be readily coupled and uncoupled without the use of tools. Each chain 82 carries a plurality of arms 84 which are equipped with tentering pins 85 for engaging the edges of fabric web 16 as shown in FIG. 10. Each chain is actuated by a drive sprocket wheel 86 which is secured to and rotatable with a rotary drive shaft 87 that is mounted on supports 41 (FIG. 9). For each sprocket wheel 86 there is provided a corresponding idler sprocket wheel 88 (FIG. 1) that is mounted for free rotation about a shaft (not shown) that is carried by an extension (not shown) of the chain housing and is, therefore, movable with the housing to position the chain, as required. Each chain is also provided with guide wheels 90 which are canted, as indicated in FIG. 9. Drive sprocket wheels 86 and idler sprocket wheels 88 are rotatable about corresponding spaced, parallel, horizontal axes and each set thereof engages and imparts movement to a corresponding chain 82. For each of the drive sprocket wheels 86 there is provided a corresponding idler sprocket wheel 88 that is mounted for free rotation about the axis of a shaft (not shown) that is carried by the forward portions of chain housings 46.

The apparatus includes a main drive system for imparting rotation to shaft 87 and sprocket wheels 86, to thereby effect actuation of corresponding pin chains 82. The main drive system comprises an electric motor 91 having a rotary shaft 92, a first pulley 93 rotatable with shaft 92, a second pulley 94 rotatable with shaft 87 and an open belt 95 which engages both pulleys. Upon energization of motor 91, belt 95, sprocket wheels 86, guide wheels 90 and portions of chains 78 move in the directions indicated by the corresponding arrows in FIG. 8. As a consequence, successive portions of each chain travel along chain advance passage 54 and then along chain return passage 56. By virtue of the over and under chain arrangement, tentering pins 85 project generally upwardly during movement of chain portions along passage 54 and project downwardly during movement of chain portions along passage 56 (FIG. 10).

As is indicated in FIGS. 1 and 2, pin chain system 40 receives the fabric from the referred-to underfeed and overfeed rolls and supports and conveys the fabric web 16 successively through a tenter housing unit 96 and a cooling unit 97, and thence to a series of wrap and support rolls 98, to be described further along herein. The fabric is then batched in roll form 100 in the usual manner with the aid of conventional batcher rolls 101. The illustrated construction includes a first fabric steamer 102 intermediate supports 42 and housing unit 96 and a second fabric steamer 103 intermediate cooling unit 97 and supports 41.

Tenter housing unit 96 is of modular design and comprises a metallic shell or casing which is rectangular in transverse cross section. The shell includes parallel outer side walls 104 (FIGS. 1 and 4) consisting of panels 105 and 106, a top wall 107 (FIG. 2) consisting of panels 108 and 109, a rear end wall 110 and a front end wall 111 (FIGS. 3 and 4). The various walls are preferably made of sheet steel and are provided with appropriate heat insulation, such as fiber glass (not shown). The walls and their panels are joined together into a unitary structure in any suitable manner known to the art. Several of the side walls are equipped with doors 112 that are hinged at 113 (FIG. 1) to permit ready access to the interior of the shell.

The interior of the housing unit is divided into a treating compartment 115 and a blower compartment 116 by coplanar partitions 117 and 118 (FIGS. 3 and 6). Partitions 117 and 118 are formed with respective pairs of openings 117' and 118'. Mounted at the rear end of the housing unit is an upstanding exhaust conduit 120 that is equipped with an exhaust fan 121. Also mounted on the housing unit is a device 122 for transmitting a combustible mixture of a suitable gas, such as natural or manufactured gas, from a source (not shown) to a conduit arrangement 123 in the front end of compartment 115 (FIG. 3). The conduit arrangement is equipped with a plurality of gas burners 124 (FIG. 4).

The illustrated embodiment of the invention includes a plurality of prefabricated nozzle units 125. Each nozzle unit, as best shown in FIG. 7, consists of an insulated base panel 126, a pair of spaced parallel side panels 127, one of which has a removable access cover 128, and a plurality of nozzles 130. The nozzles are supported at the ends of the side panels 127 remote from base panel 126 and are formed with full length discharge slots 131. The opening defined by panels 126 and 127 and nozzles 130 constitute a plenum or space 132 for receiving air or other gaseous mediums. As is indicated in FIGS. 3 and 5, a first plurality of nozzle units is arranged in series relation to obtain an upper row thereof. A second plurality of nozzle units is arranged in series relation to obtain a lower row thereof. The nozzle units in the upper row are inverted relative to the nozzle units in the lower row. The chain housings and the rows of nozzle units are so constructed and arranged that the discharge slots of the nozzle units are positioned quite close to the fabric web in the course of movement of the web through the housing unit.

It will be observed from an examination of FIG. 4 that the side panels of the nozzle units are positioned inwardly from corresponding side walls of the housing unit to provide side passages 133 which extend the full length of the housing unit. These passages serve two functions. First, they permit access to various parts within the housing unit for purposes of maintenance or repair. Secondly, they serve as recirculation passages for a gaseous medium used in treating the fabric web.

Located within compartment 116 is a pair of upper blowers 134 and a pair of lower blowers 135 which communicate with the corresponding plenums 132 by way of openings 117' and 118'. The several blowers are operated in unison by an electric motor 136 (FIG. 1) and are adapted to transmit an appropriate gaseous medium, such as atmospheric air, along the plenums, through the corresponding nozzles and onto the fabric web to effect support, drying or other desired treatment of the fabric web. The circulatory path of the gaseous medium is indicated by the arrows in FIGS. 3 and 4.

Cooling unit 97, which is illustrated in FIGS. 1 and 2, comprises a housing 137 that is supported on legs 138 immediately forward of housing front end wall 111. Housing 137 is provided with a removable panel or side door 139 to permit ready access to its interior. Mounted on the housing is a cooling unit 140 which includes a fan (not shown). Unit 97 serves the usual function of cooling the fabric after treatment within housing unit 96 and prior to unpinning and batching.

Based on the foregoing, it is believed that the construction, operation, objects, features and advantages of the present invention will be readily comprehended by persons skilled in the art, without further description. It is to be clearly understood, however, that various changes in the construction described above and illustrated in the drawings may be made without departing from the scope of the invention, it being intended that all matter contained in the description or shown in the drawings shall be interpreted as illustrative only and not in a limiting sense.

I claim:

1. In apparatus of the character described for use with a web of a material, such as an open width knit fabric:
   (a) support means;
   (b) a pair of spaced chain housings mounted on the support means, arranged generally horizontally and movable relative to each other and comprising
     (1) a series of lower sections;
     (2) a series of upper sections overlying the lower sections;
     (3) one end of each upper section being intermediate the ends of a lower section therebelow and the other end of such upper section being intermediate the ends of a next successive lower section therebelow;

(4) the housing sections defining a first passage through and along which successive first portions of the corresponding chain extend and ride and a second passage through and along which successive second portions of the corresponding chain extend and ride, said second portions of such chain being inverted relative to said first portions;

(c) portions of each housing being pivotal relative to each other;

(d) adjusting means for varying the distance between the housings and for effecting pivotal movement of said portions thereof;

(e) a continuous chain extending through each housing;

(f) actuating means for imparting movement to the chains relative to the housings; and (g) gripping means secured to and movable with each chain for engaging a corresponding edge of the web material.

2. In apparatus of the character described for use with a web of a material, such as an open width knit fabric:

(a) support means;

(b) a pair of spaced chain housings mounted on the support means, arranged generally horizontally and movable relative to each other;

(c) portions of each housing being pivotal relative to each other;

(d) adjusting means for varying the distance between the housings and for effecting pivotal movement of said portions thereof and comprising (1) rotary means mounted on the support means;

(2) at least one pair of members rotatable with the rotary means; and (3) a continuous flexible connector engaging each of the members and movable in response to rotation thereof;

(4) each chain housing being secured to and movable with the flexible connector;

(e) a continuous chain extending through each housing;

(f) actuating means for imparting movement to the chains relative to the housings; and (g) gripping means secured to and movable with each chain for engaging a corresponding edge of the web material.

3. Apparatus according to claim 2 wherein each of the pair of members is rotatable about an axis that is spaced from and parallel to the axis of the other such member.

4. Apparatus according to claim 2 wherein;

(a) each of the pair of members comprises a sprocket wheel; and (b) the flexible connector comprises a chain engageable with the sprocket wheels.

5. In apparatus of the character described for use with a web of a material, such as an open width knit fabric:

(a) support means;

(b) a pair of spaced chain housings mounted on the support means, arranged generally horizontally and movable relative to each other;

(c) portions of each housing being pivotal relative to each other;

(d) adjusting means for varying the distance between the housings and for effecting pivotal movement of said portions thereof and comprising (1) a rotary first shaft mounted on the support (2) a second shaft mounted on the support means in spaced, substantially parallel relation to the first shaft;

(3) a first sprocket wheel carried by and rotatable with the first shaft;

(4) a second sprocket wheel carried by and rotatable about the axis of the second shaft; and (5) a continuous chain engaging both sprocket wheels, movable in response to rotation thereof and connected to each chain housing;

(e) a continuous chain extending through each housing;

(f) actuating means for imparting movement to the chains relative to the housings; and (g) gripping means secured to and movable with each chain for engaging a corresponding edge of the web material.

6. In apparatus of the character described for use with a web of a material, such as an open width knit fabric:

(a) support means;

(b) a pair of spaced chain housings mounted on the support means, arranged generally horizontally and movable relative to each other and comprising (1) a series of lower sections;

(2) a series of upper sections overlying the lower sections;

(3) one end of each upper section being intermediate the ends of a lower section therebelow and the other end of such upper section being intemediate the ends of a next successive lower section therebelow;

(4) the housing sections defining a first passage through and along which successive portions of the corresponding chain are contained, extend and ride and a second passage through and along which part of other successive portions of the corresponding chain extend and ride;

(c) portions of each housing being pivotal relative to each other;

(d) adjusting means for varying the distance between the housings and for effecting pivotal movement of said portions thereof;

(e) a continuous chain extending through each housing;

(f) actuating means for imparting movement to the chains relative to the housings; and (g) gripping means secured to and movable with each chain for engaging a corresponding edge of the web material.

References Cited

UNITED STATES PATENTS

| 29,040 | 7/1860 | Rowe | 138—100 |
|---|---|---|---|
| 1,197,739 | 9/1916 | Hutchins | 138—100X |
| 1,683,544 | 9/1928 | Hansen | 138—100X |
| 1,332,706 | 3/1920 | Boland | 34—158X |
| 1,717,004 | 6/1929 | Buck | 26—60 |
| 1,719,612 | 7/1929 | Kenyon | 26—60 |
| 347,212 | 8/1886 | Varney | 26—61(A)(UX) |
| 544,098 | 8/1895 | Horton | 26—61(AX) |
| 2,729,874 | 1/1956 | McCreary | 26—61(A) |
| 2,894,334 | 7/1959 | Thygeson, Sr. | 26—60X |
| 3,066,377 | 12/1962 | Waterman | 26—61(B) |
| 3,371,428 | 3/1968 | Thygeson, Sr. et al. | 34—158 |

FOREIGN PATENTS

| 1,360 | 1865 | Great Britain | 26—57 |
|---|---|---|---|
| 2,956 | 1886 | Great Britain | 26—57 |
| 478,676 | 2/1953 | Italy | 26—60 |
| 362,069 | 10/1922 | Germany | 26—60 |
| 6,104 | 1831 | Great Britain | 26—61(A) |

ROBERT R. MACKEY, Primary Examiner

U.S. Cl. X.R.

26—60; 34—158